(12) United States Patent
Pahwa et al.

(10) Patent No.: US 11,859,877 B2
(45) Date of Patent: Jan. 2, 2024

(54) HYBRID ADSORBER HEAT EXCHANGING DEVICE AND METHOD OF MANUFACTURE

(71) Applicants: Deepak Pahwa, Delhi (IN); Bidyut Baran Saha, Fukuoka (JP); Anil Kumar Choudhary, Gurgaon (IN); Rajan Sachdev, Delhi (IN); Kuldeep Singh Malik, New Delhi (IN); Kyaw Thu, Singapore (SG)

(72) Inventors: Deepak Pahwa, Delhi (IN); Bidyut Baran Saha, Fukuoka (JP); Anil Kumar Choudhary, Gurgaon (IN); Rajan Sachdev, Delhi (IN); Kuldeep Singh Malik, New Delhi (IN); Kyaw Thu, Singapore (SG)

(73) Assignee: BRY-AIR [ASIA] PVT. LTD., Delhi (IN)

( * ) Notice: Subject to any disclaimer, the term of this patent is extended or adjusted under 35 U.S.C. 154(b) by 0 days.

(21) Appl. No.: 15/110,809

(22) PCT Filed: Jan. 9, 2015

(86) PCT No.: PCT/IN2015/000013
§ 371 (c)(1),
(2) Date: Jul. 11, 2016

(87) PCT Pub. No.: WO2015/104719
PCT Pub. Date: Jul. 16, 2015

(65) Prior Publication Data
US 2016/0334145 A1    Nov. 17, 2016

(30) Foreign Application Priority Data
Jan. 10, 2014   (IN) .......................... IN 81 DEL 2014

(51) Int. Cl.
*F25B 17/08*    (2006.01)
*F28F 13/18*    (2006.01)
*F25B 35/04*    (2006.01)

(52) U.S. Cl.
CPC .............. *F25B 17/08* (2013.01); *F25B 35/04* (2013.01); *F28F 13/185* (2013.01); *F28F 13/18* (2013.01); *Y02A 30/27* (2018.01); *Y02B 30/00* (2013.01)

(58) Field of Classification Search
CPC . F25B 17/08; F25B 35/04; F28F 13/18; F28F 13/185
(Continued)

(56) References Cited

U.S. PATENT DOCUMENTS 6,208,513 B1 *   3/2001   Fitch ................... H01L 23/3672
                                                        165/185
7,063,131 B2 *   6/2006   Northrop .................. F28F 1/24
                                                        165/133
(Continued)

FOREIGN PATENT DOCUMENTS

EP    0 470 886     2/1992
JP    H06-170219    6/1994
(Continued)

OTHER PUBLICATIONS

English translation of JPH11287531.*
(Continued)

*Primary Examiner* — Joel M Attey
(74) *Attorney, Agent, or Firm* — Nixon & Vanderhye, PC

(57) ABSTRACT

The present invention provides a hybrid adsorption heat exchanging device comprising: at least one tubular or micro channel structure for carrying a heat transfer fluid; the external surface of said structure being provided with extensions in at least two locations; said extensions forming a bed
(Continued)

therebetween for providing one or more adsorbent materials; a coating of adsorbent material being provided on at least a part of said extensions.

20 Claims, 18 Drawing Sheets

(58) Field of Classification Search
USPC .......................................................... 165/133
See application file for complete search history.

(56) References Cited

U.S. PATENT DOCUMENTS

| | | | |
|---|---|---|---|
| 2001/0054495 A1* | 12/2001 | Yevin ...................... | F28D 15/02 165/104.26 |
| 2006/0162916 A1* | 7/2006 | Wand ...................... | F28D 9/005 165/167 |
| 2008/0034785 A1* | 2/2008 | Yanagi .................. | F25B 17/083 62/478 |
| 2009/0217526 A1 | 9/2009 | Mittelbach et al. | |
| 2011/0319673 A1 | 12/2011 | Dunne et al. | |
| 2013/0192281 A1* | 8/2013 | Nam ..................... | B60H 1/3201 62/101 |
| 2014/0144500 A1* | 5/2014 | Cao ...................... | H01L 31/0322 136/256 |
| 2016/0060777 A1* | 3/2016 | Chung ..................... | C25C 1/02 205/771 |
| 2016/0076815 A1* | 3/2016 | Chen ......................... | F28F 1/32 165/181 |

FOREIGN PATENT DOCUMENTS

| | | |
|---|---|---|
| JP | H11-287531 | 10/1999 |
| JP | 2003-251133 | 9/2003 |

OTHER PUBLICATIONS

International Search Report for PCT/IN2015/000013 dated Aug. 4, 2015, 4 pages.
Written Opinion of the ISA for PCT/IN2015/000013 dated Aug. 4, 2015, 5 pages.

* cited by examiner

Adsorber Bed Coated With Adsorbent

Adsorber Bed Heat Exchanger Coated With Adsorbent + Filled with Adsorbent Coated Substrate

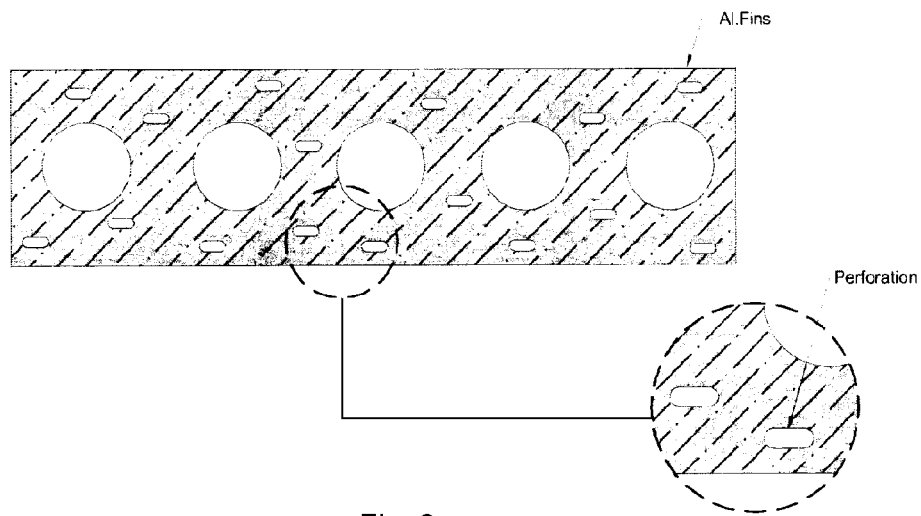

| Hybrid adsorption heat exchanger | ← Water<br>→ Water |

Fig. 4(g)

| Adsorption heat exchanger (Figs. 4(q) - 4(F)) |
| Chilled beams |

Fig. 4(i)

| Adsorption heat exchanger (Figs. 4(q) - 4(F)) |
| Adsorption refrigeration machine |

Fig. 4(h)

| Adsorption heat exchanger (Figs. 4(q) - 4(F)) |
| Automobile air conditioning unit |

Fig. 4(j)

| Adsorption heat exchanger (Figs. 4(q) - 4(F)) |
| Domestic split level air conditioning unit |

Fig. 4(l)

| Adsorption heat exchanger (Figs. 4(q) - 4(F)) |
| Domestic integral air conditioning unit |

Fig. 4(k)

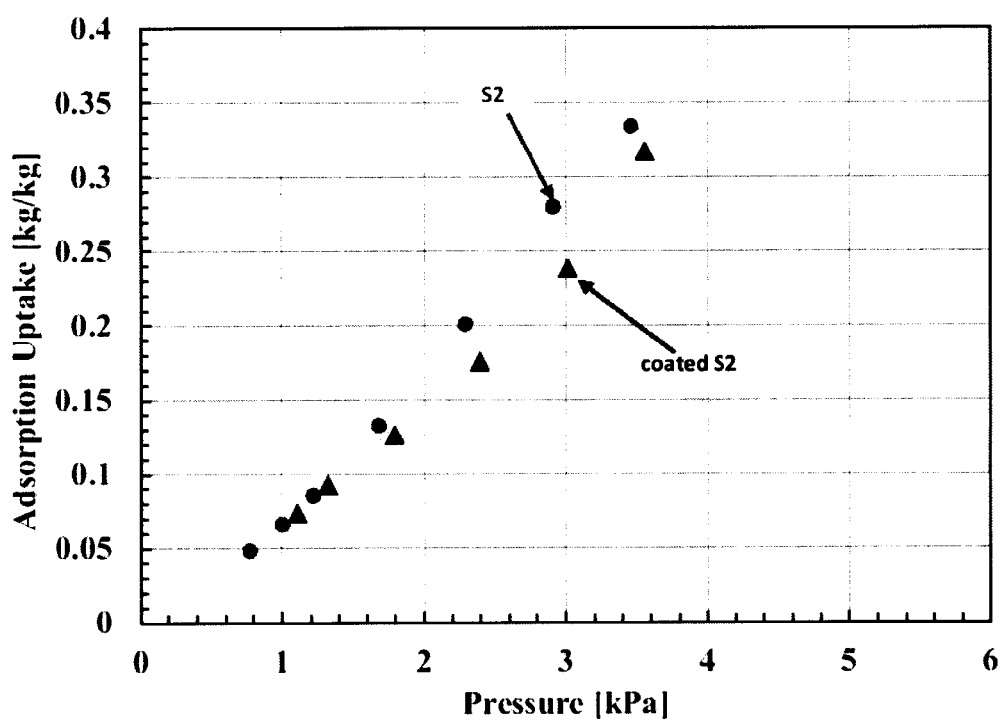
Figure 7. Adsorption isotherm of water onto S2 and coated S2 at 30 ºC.

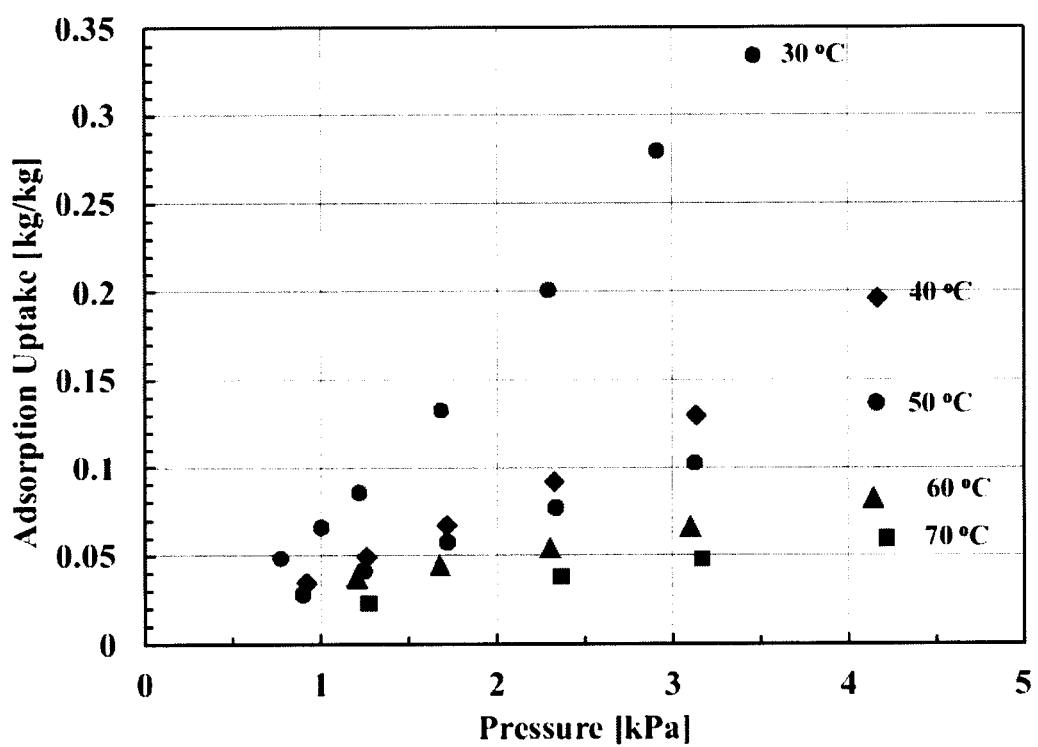
Figure 8. Adsorption isotherms of water onto S2 adsorbent (up to 5 kPa).

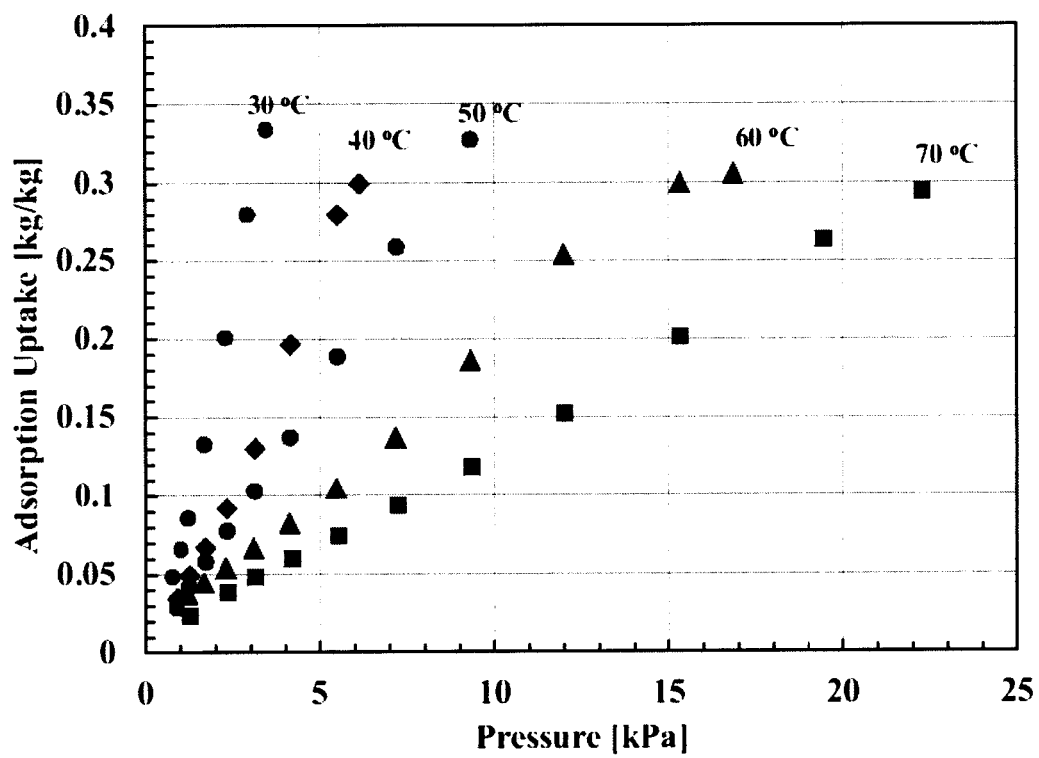
Figure 9. Adsorption isotherms of water onto S2 adsorbent.

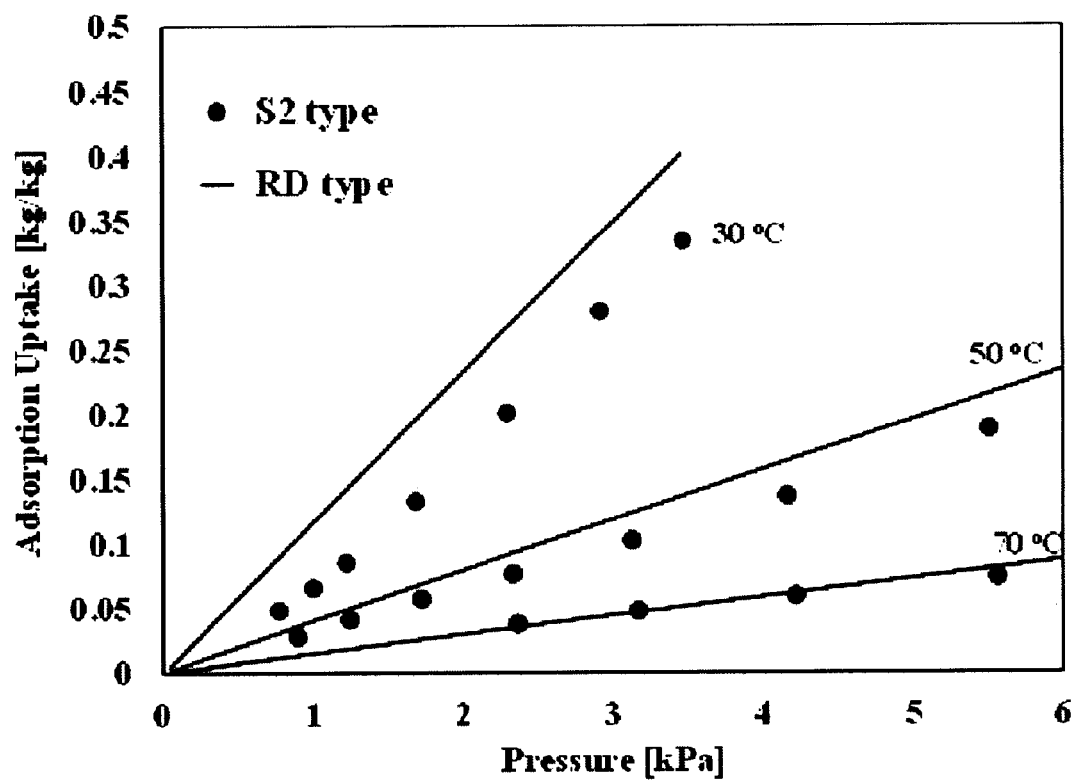
Figure 10. Adsorption isotherms of water onto S2 type and Fuji RD type silica gels.

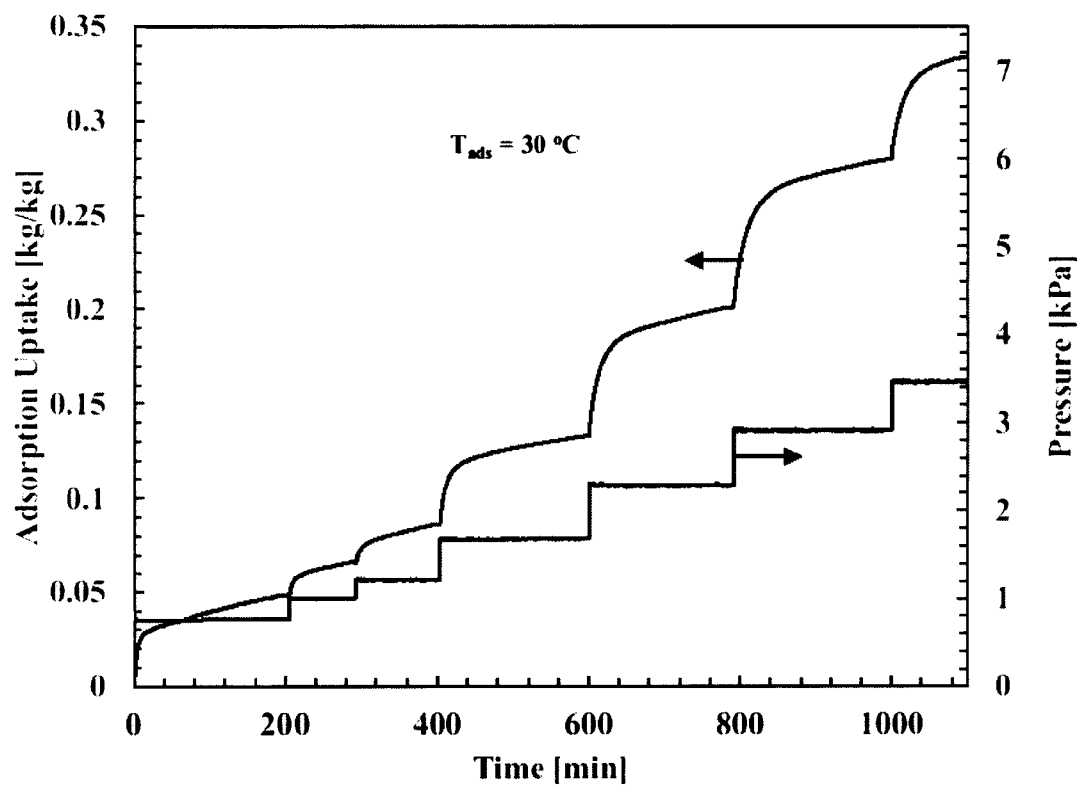
Figure 11(a). Profiles of adsorption uptake and pressure for S2 type silica gel/water pair at adsorption temperature 30ºC.

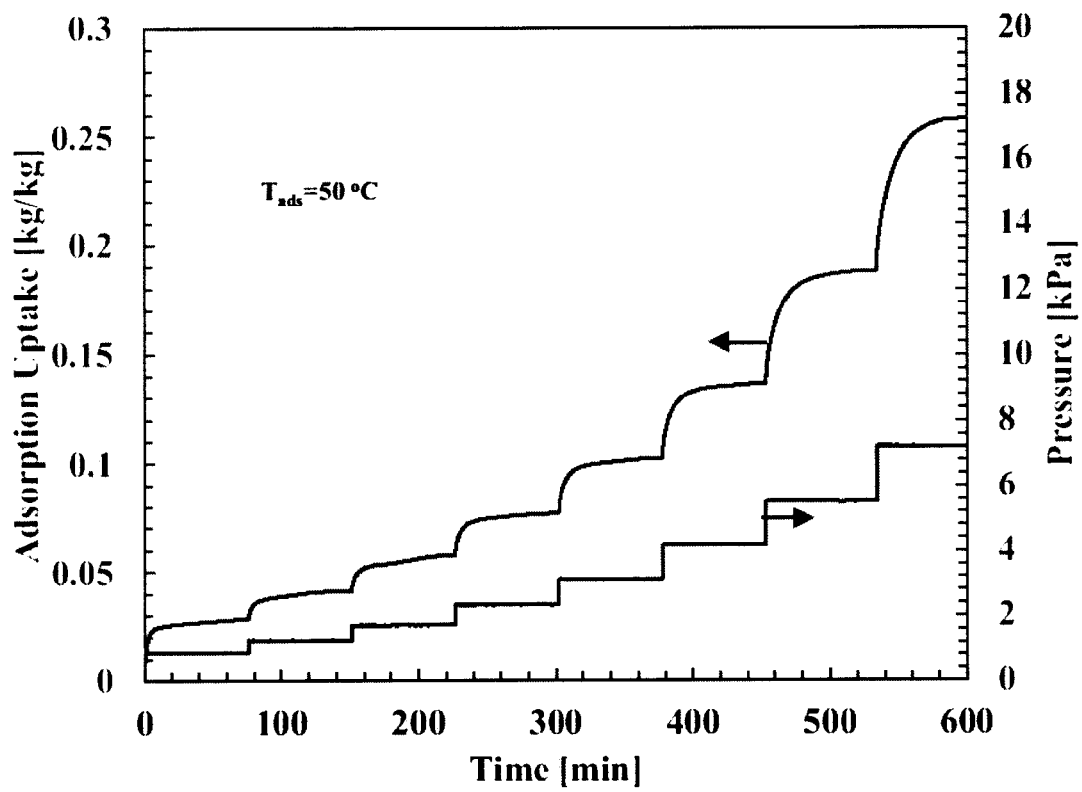
Figure 11(b). Profiles of adsorption uptake and pressure for S2 type silica gel/water pair at adsorption temperature 50ºC.

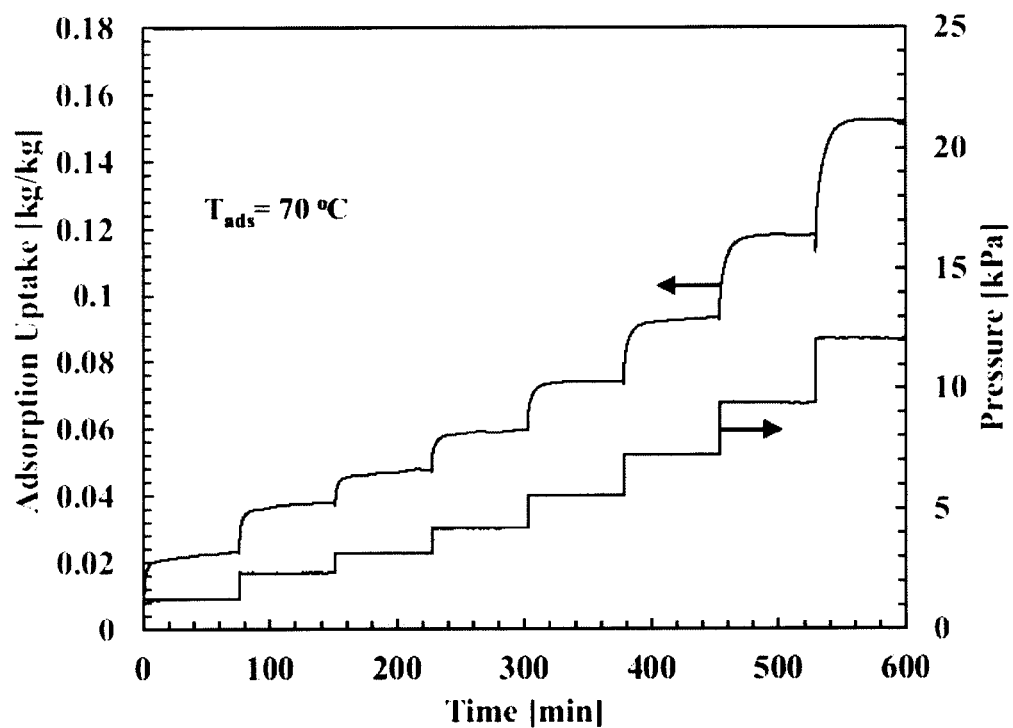
Figure 11(c). Profiles of adsorption uptake and pressure for S2 type silica gel/water pair at adsorption temperature 70°C.

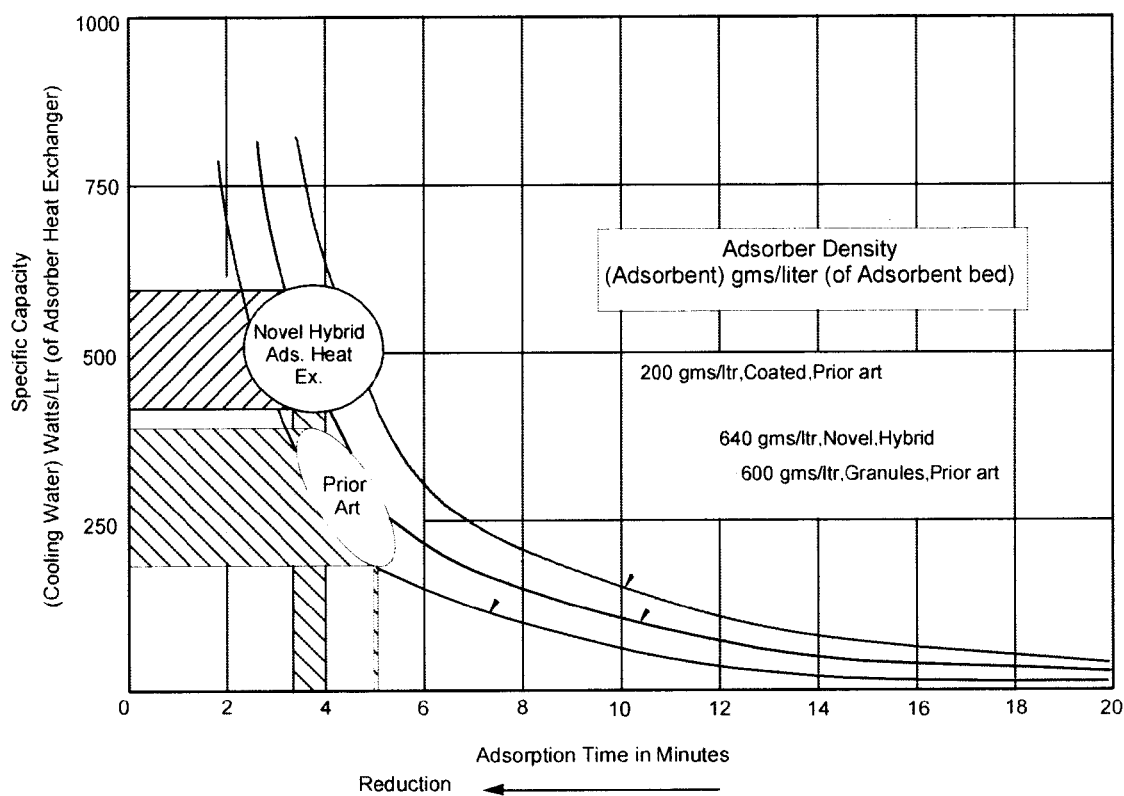
Figure 12 - Comparative representation of specific capacity in cooling Watts per liter of prior art adsorbent heat exchanger and novel hybrid adsorption heat exchanger of invention.

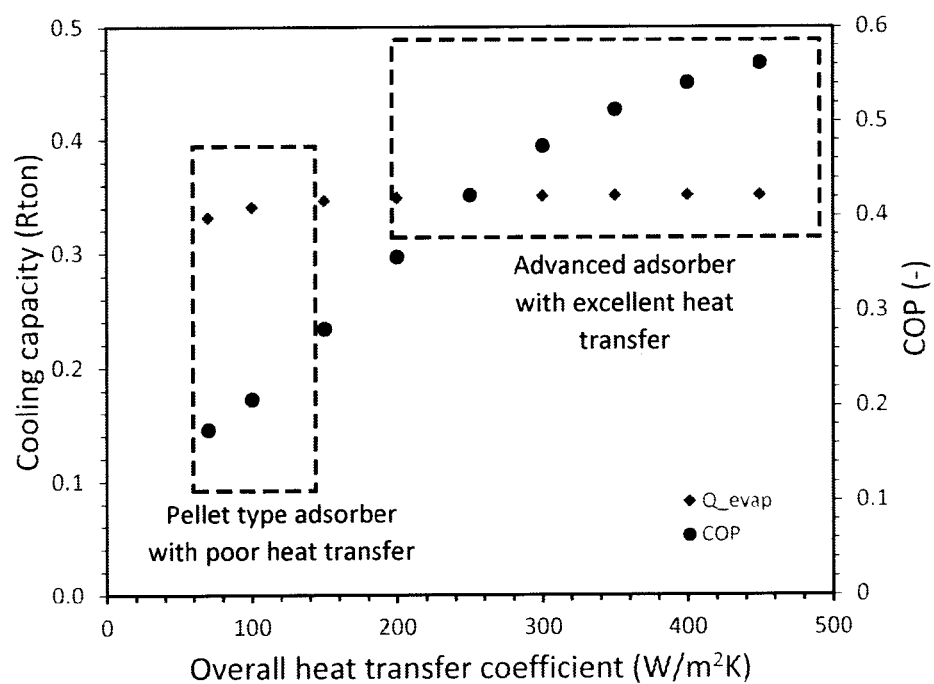
Figure 13- Performance of the adsorption chiller with different types of adsorber heat exchanger configurations and heat transfer inside the adsorber

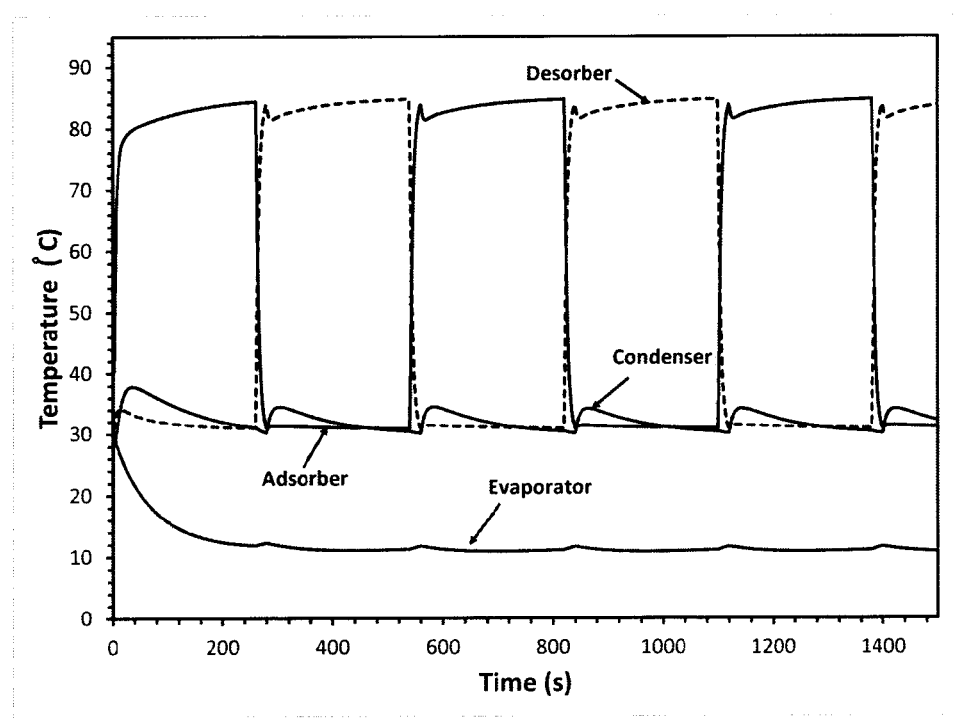
Figure14 -The temperature profiles of the adsorption chiller using coated-type adsorbent translating to improved overall heat transfer coefficients for adsorption and desorption (Uads=350 W/m²K).

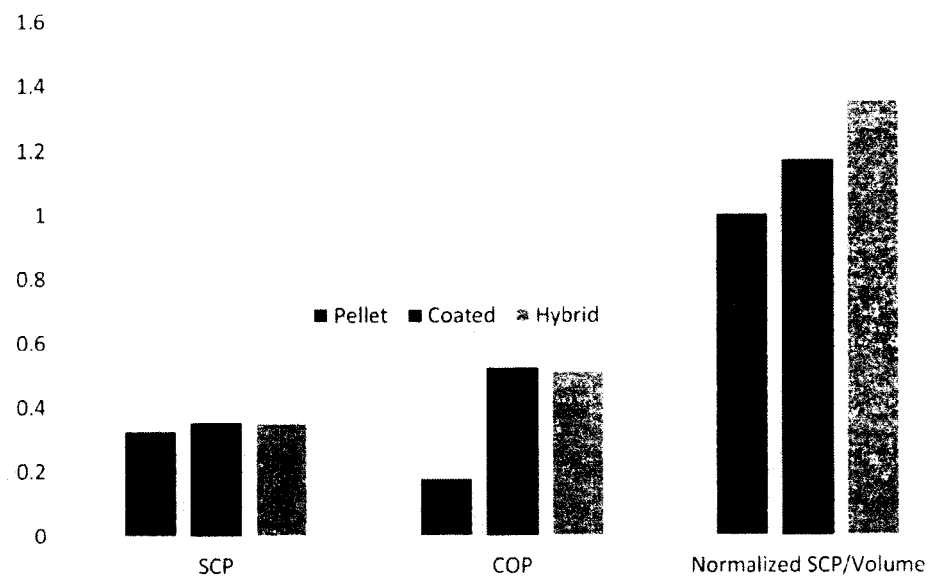
Figure 15 – Performance comparison for pellet, coated and hybrid type adsorber/desorber heat exchanger.

HYBRID ADSORBER HEAT EXCHANGING DEVICE AND METHOD OF MANUFACTURE

This application is the U.S. national phase of International Application No. PCT/IN2015/000013 filed 9 Jan. 2015 which designated the U.S. and claims priority to IN Patent Application No. IN: 81/DEL/2014 filed 10 Jan. 2014, the entire contents of each of which are hereby incorporated by reference.

FIELD OF THE INVENTION

The present invention relates to hybrid adsorber heat exchanging devices, such as heat exchanger systems. The systems of the invention are useful in environments where adsorbate is required to be temporarily or periodically stored and released. In particular, the present invention relates to adsorbent based heat exchanger systems for adsorption cooling, heat pump and desalination applications. The present invention also provides a method for the manufacture of such hybrid adsorber heat exchanging devices, and applications of such heat exchanging device.

BACKGROUND OF THE INVENTION

The concerns of environmental pollution and primary energy consumption issues call for the rapid development of environmentally benign energy conservative technologies. Among them, thermally powered adsorption systems are considered as one the key technologies as these systems can recover and reuse low-temperature waste heat sources which otherwise will be purged to the ambient.

There is a recognized need to replace existing mechanically or electrically driven vapour compression based systems used for chilling or refrigeration purposes. Such systems typically use gases such as hydrofluoro carbons. It is now recognised that there is a need to replace the use of such materials in view of the deleterious effect they have on the environment.

One of the mechanisms used to replace conventional vapour compression based systems is to use heat exchangers which utilise adsorbent beds in order to ensure mass transfer as well as heat transfer.

Adsorbent materials are classified according to their properties into physical adsorbents, chemical adsorbents, and composite adsorbents. Physical adsorbents are materials that have differing pore sizes. Typical of this category are mesoporous silicates, zeolites, metaluminophosphates, porous carbons and metal organic frameworks. Mesoporous silicates include materials such as synthetic amorphous silica gel which consists of a rigid and continuous net of colloidal silica connected to small grains of hydrated $SiO_4$. Porous carbons include activated carbons obtained by gasifying char with an oxidising agent. Zeolites include crystalline microporous alumina silicate materials and include several ranges such as HZSM-5, ZSM5, zeolite HY etc. The advantages of zeolite or zeolite based materials are their diversity of uses, and their susceptibility to modification dependent on the purpose of use. Metal organic frameworks are a new generation of materials which are microporous, have high porosity, uniform pore size and have well defined adsorption sites and large surface area. These frameworks typically comprise of organic linkers which connect metal centres.

Chemical adsorbents comprise substances used in chemisorption. These include metal chlorides such as calcium chloride, barium chloride, strontium chloride etc., salt and metal hydrides such as lithium hydride, calcium hydride, high polymerised hydrides of covalent nature, and non-metal molecular hydrides, and metal oxides.

Composite adsorbents include combinations of chemical and physical adsorbents such as combinations of metal chloride and activated carbon fibres, expanded graphite, silica gel, or zeolite. Composite adsorbents provide an advantage in enhancement of performance of physical adsorbents without incurring the effect of chemical adsorbents such as swelling, poor conductivity, or agglomeration.

PRIOR ART

Several different heat exchange mechanisms have been postulated in the art as replacement for conventional vapour compression based refrigeration systems. Some of these are discussed below for the purpose of reference.

A two-bed adsorbent based cooling system comprises of separated heat exchangers. Essentially, this mechanism comprises of four main parts, two reactors which function as adsorber or desorber depending on the operating mode, an evaporator and a condenser. The reactors are packed with adsorbent material to adsorb or desorb the adsorbate during the adsorption or desorption processes. The flow of the medium is regulated using refrigerant valves.

One alternative to the two bed adsorption cooling system is a system that uses an integrated adsorption mechanism. This usually comprises two units, wherein each unit is provided with an adsorbent bed, an evaporator and a condenser. The heat exchange cycle in this device comprises of two modes—evaporation triggered adsorption which is known as adsorption/evaporation mode and desorption resulted condensation which is known as desorption/condensation mode. Control valves are provided to control the flow of secondary fluid to each unit.

Another alternative mechanism involves a three bed adsorption system. This consists of three reactors in addition to the condenser and the evaporator. A three bed heat exchange system enables continuous evaporation. This mechanism has four operational modes—preheating, desorption, pre-cooling and adsorption.

Multistage systems are also available which are used to utilise low temperature heat sources. These systems operate at temperatures that are not suitable for a two bed adsorption cooling system.

As discussed above, an adsorption cooling system can effectively utilize low-grade waste heat or solar thermal energy of temperature typically below 100° C. and can produce effective cooling energy. Thermally driven adsorption cooling cycle does not require any electricity to drive the cycle and it is environmentally friendly as it utilizes natural refrigerants or alternative to HFC based refrigerants. Moreover, this system requires a lesser level of maintenance and is also free from moving parts. However, the main drawbacks of the low-temperature thermally powered adsorption cooling system are its poor performance in terms of specific cooling capacity and coefficient of performance and relatively larger footprint as opposed to conventional vapour compression cycle.

Adsorption heat exchangers typically comprise a heat exchanger structure which is used for supplying and discharging thermal energy and which is in a thermal contact with a sorbent material which uses a phase change of an adsorbate working medium for binding and releasing latent heat. Heat is released through the condensation of a vaporous working medium. Conversely, the thermal energy supplied via the heat exchanger structure can be used for the renewed vaporization of the adsorbate.

Solids materials are mostly used for performing the phase change of the adsorbate, which are so-called sorbent or adsorbent materials. A characteristic for such sorbent materials are their open-pore structure with a high ratio of surface to volume. The inner cavities in these materials have molecular magnitude dimensions. The effect of the sorbent materials is based on adsorbing foreign atoms and foreign molecules in their micro-porous structure and thus to transfer from the gas phase to a bonded state. Examples for sorbent materials used in adsorption heat exchangers are clays such as bentonite, silica gel or zeolites. Water is usually used as the working medium for these sorbent materials since it has a high heat of condensation and is also easy to use.

Adsorption based heat exchange systems are driven by the adsorption and desorption of an adsorbate vapour by a porous solid adsorbent. In contrast to conventional vapour-compression cooling systems which are driven by a mechanical compressor, no electrical energy is needed to drive the adsorption cycle. The basic cycle involves an adsorption phase and a desorption phase. In the adsorption phase, the refrigerant vapour is adsorbed by the adsorbent substance resulting in the release of heat. In the desorption phase, heat is applied to the adsorbent causing desorption of the refrigerant. The heat transferred during these processes is conveyed by a heat exchanger between the adsorbent and a heat transfer fluid (e.g. water or methanol or a water-glycol mixture) or an external environment. The adsorption and desorption processes occur in conjunction with evaporation and condensation of refrigerant in an evaporator/condenser. The adsorption of the gaseous refrigerant lowers the vapour pressure, promoting evaporation of the liquid refrigerant in the evaporator. During this evaporation, heat is extracted from an environment to be cooled, resulting in refrigeration. By supplying heat to the adsorbent via the heat exchanger, the adsorbed refrigerant is released into the vapour phase, thus regenerating the adsorbent material for the next adsorption cycle. The resulting gaseous adsorbate passes to a condenser where heat rejection to the environment takes place. As in conventional vapour-compression cooling, the liquid refrigerant is passed through a control device (e.g. an expansion valve) back into the evaporator, and the cycle can then be repeated.

When an adsorption heat exchanger is supplied with thermal energy from the outside, e.g. by having a heat carrier liquid flow through the same, the heat flowing in from the outside needs to be transferred effectively to the porous sorbent material in order to release the adsorbed working medium situated in the same. In the opposite case, the release of thermal energy, which means an energy flow direction out of the adsorption heat exchanger, the thermal energy released as a result of the condensation of the working medium on the porous sorbent material needs to be transported from the adsorption heat exchanger to the outside. Since known porous sorbent materials show adverse thermal conductivity, adsorption heat exchangers are usually produced as a combination of a heat exchanger structure with high thermal conductivity and the porous sorbent material that is used for binding and releasing the working medium. The heat exchanger structures mostly consist of metallic materials such as copper, aluminum or stainless steel, as well as other materials with a high thermal conductivity such as ceramic materials, carbon materials, carbon fiber reinforced plastic (CFRP) materials and certain plastic materials.

Heat exchangers comprise cavities for allowing direct flow with a heat carrier medium which usually does not come into direct contact with the sorbent material. The heat exchanger structure comes into thermal contact with the sorbent material. In the simplest of cases this occurs in the form of bulk material, with the sorbent material being mostly present in the form of powder or by mixture with a binder in the form of pellets.

Thermally powered adsorption chillers have been proposed for space cooling applications. These chillers are virtually free of moving parts, except for the On/Off operation of the refrigerant valves that separately connect the adsorbent beds to the evaporator and condenser. Therefore these systems are highly reliable and require almost no maintenance. Adsorption chillers are also capable of being miniaturized, since adsorption of refrigerant into and desorption of refrigerant from the solid porous adsorbent are primarily surface, rather than bulk processes.

As seen above several methods are postulated in the art for heat exchange mechanisms. Some of the references are briefly discussed below.

U.S. Pat. No. 8,053,032 explains a method for production of a heat exchanger substrate wherein a zeolite layer is deposited/produced on the substrate surface by direct crystallization. However, there is no reference or teaching in this patent towards any hybridization techniques.

U.S. Pat. No. 8,590,153 discloses an adsorption heat exchanger where an adhesive layer/coating is formed on the heat exchanger structure and the exchanger is then dipped into sorbent material to ensure adhesion thereof. The method of coating essentially comprises use of a finished manufactured heat exchanger which is thereafter coated with the sorbent material, by a process of dipping. As will be appreciated, this method may have the limitations of unevenness of coating thickness, agglomeration of porous solid material in certain portions leading to uneven coating and thereby in itself adversely impacting performance.

US Patent Publication 2010/0136326 discloses a method by which a layer composite comprising of a metal support substrate and a silicate layer is obtained by coating the substrate surface with the silicate layer obtained through solvothermal synthesis. There is no disclosure in this publication of any attempts to hybridise heat exchange mechanisms, or attempt to improve kinetic performance of the heat exchanger without compromising on adsorbent volume or heat exchanger footprint.

US Patent Publication 2011/0183836 unveils an aluminium containing substrate for a heat exchanger. A microporous layer of aluminium phosphate zeolite is applied to the substrate, inter alia other layers. The publication again focuses on increasing the number of layers forming the coating on the substrate, wherein at least one layer is $ALPO_4$, and does not provide any information or guidance towards attempts to increase kinetic performance of heat exchangers through hybridization techniques.

US Patent Publication 2012/0216563 discloses a heat exchanger wherein a porous material is provided in contact with the tubular portion of the exchanger in order to allow vapour to pass through. The material is a fibrous material. However, there is again no disclosure or guidance on whether this is useful for improving performance kinetics or whether additional hybridization techniques can be used.

US Patent Publication 2013/0014538 discloses a sub-assembly for an adsorption chiller. The sub-assembly is provided with an adsorption component including a multiplicity of plates which are arranged in a stack. The refrigerant sides of adjacent pairs of the plates in the stack define refrigerant passages and an adsorbent material is provided within these passages. However, there is no disclosure or guidance therein on whether this arrangement contributes or provides any improvement in performance kinetics.

JP Patent Publication No. 2011-240256 discloses an adsorbent block which is provided with a plurality of activated carbon fibers. These fibers are all directed in the same direction. A cylindrical metal sheet is provided covering the outer circumference of the activated fibers, in a manner such that the axial direction. This is obtained by covering the fibers with the cylindrical metal sheet and then unidirectionally rolling out and cutting the sheet. However, there is no disclosure or guidance therein on whether this arrangement contributes or provides any improvement in performance kinetics.

JP Patent Publication No. 2005-291528 discloses a heat exchanger with enhanced adsorber capacity. The heat exchanger comprises a plate fin tube type heat exchanger with a specific fin pitch, fin length and fin height. Activated charcoal is used as a filler adsorbent wherein the charcoal has specific steam adsorbing capacity. the bed so formed is covered by a net like material to prevent leakage of the adsorbent material. However, there is no disclosure or guidance therein on whether this arrangement contributes or provides any improvement in performance kinetics. Again, the focus in this disclosure is on modifying the fin dimensions and adjusting the adsorbent material characteristics to enhance adsorbent power.

SUMMARY OF THE INVENTION

The present invention provides a hybrid adsorption heat exchanging device comprising at least one tubular or microchannel structure for carrying a heat transfer fluid, the external surface of said structure being provided with extensions in at least two locations, said extensions forming a bed there between for providing one or more adsorbent materials, a coating of adsorbent material being provided on at least a part of said extensions.

In one embodiment, the extensions run longitudinally along the full length of the tubular structure or can run circumferentially around the tubular structure, with the height of each extension remaining substantially uniform along the entire length thereof.

If another embodiment, the tubular structure and the extensions are integral, or can be connected to each other through separate connecting means.

If desired, the tubular structure and the extensions are made of the same material and can be made from a heat conductive material which is metallic, ceramic based, polymeric or carbon based materials.

In another embodiment of the invention, each extension is coated with an adsorbent being the same or different from the adsorbent filling in the bed.

In yet another embodiment, the adsorbent material provided in said bed is selected from the group consisting of zeolites, mesoporous silicates, insoluble metal silicates, silica gel type A, silica gel type RD, silica gel type S2, activated carbon fiber, granular activated carbon, activated alumina, highly porous activated carbon, $Zr_6O_4(OH)_4$ bonded with linkers, MIL-101Cr, MOFs (metal-organic frameworks), COFs (covalent organic frameworks), FAMs (functional adsorbent materials), and the like, singularly or in any combination thereof.

In yet another embodiment of the invention, the adsorbent material comprises adsorbent granules having a pore diameter in the range of 3 to 100 angstromto or plain or corrugated sheets with adsorbent coated or deposited thereon or a combination thereof disposed in any predetermined pattern.

In yet another embodiment of the invention, the plain or corrugated sheets are made of a thermally conductive material selected from the group consisting of aluminium, copper, graphite/expanded graphite, inorganic or organic fiber substrates or combinations thereof, and can optionally be perforated sheets.

In another embodiment of the invention extensions are corrugated on the external surface thereof prior to coating with adsorbent material, and wherein the coating is selected from the group consisting of zeolites, mesoporous silicates, insoluble metal silicates, silica gel type A, silica gel type RD, silica gel type S2, activated carbon fiber, granular activated carbon, activated alumina, highly porous activated carbon, $Zr_6O_4(OH)_4$ bonded with linkers, MIL-101Cr, MOFs (metal-organic frameworks), COFs (covalent organic frameworks), FAMs (functional adsorbent materials), and the like, singularly or in any combination thereof.

In yet another embodiment of the invention, the heat transfer fluid is selected from the group consisting of water, lower alcohols, oils, and the like.

In another embodiment of the invention, the adsorbent material is provided with one or more dopants selected from the group consisting of inorganic metals salts such as calcium chloride, lithium bromide, magnesium chloride, magnesium sulphate, calcium nitrate, manganese chloride, and the like In another embodiment of the invention, one or more additives selected from the group consisting of carbon fibers, graphite fibers, and the like are also added to enhance thermal conductivity.

If desired, a polymeric mesh is provided over the adsorbent bed, wherein the polymer is aniline.

The invention also provides a method for the manufacture of a hybrid adsorption heat exchanging device, said method comprising:
  coating at least a part of a thermally conductive material with an adsorbent material;
  converting the at least partially coated thermally conductive material into a tubular structure for carrying a heat transfer fluid, and providing two or more extensions thereon, said extensions being either integral with said coated tubular structure, or comprising at least partly adsorbent coated thermally conductive material, said extensions forming an adsorbent bed therebetween;
  providing one or more adsorbent material in said adsorbent bed.

BRIEF DESCRIPTION OF THE ACCOMPANYING DRAWINGS

The invention will be described in greater detail below inter alia, with reference to the accompanying drawings wherein.

Figure 4A:
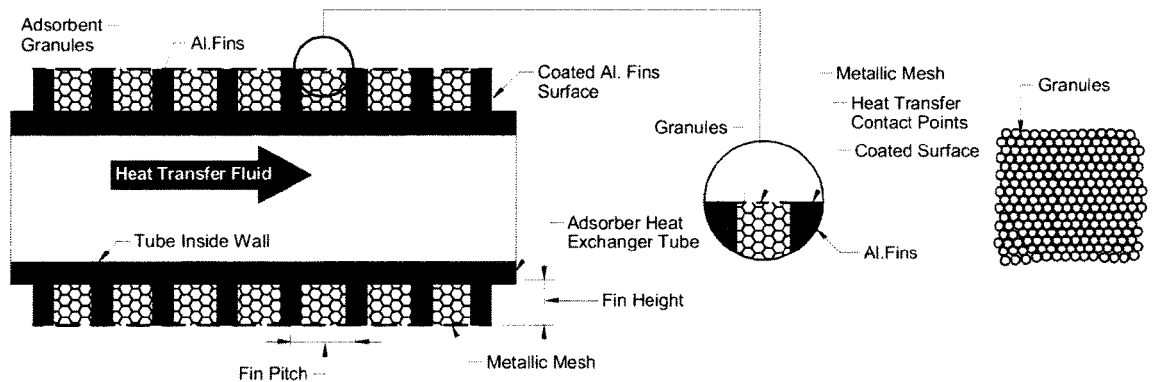
FIG. 4(a) is a representation of an adsorbent bed wherein the fins of the adsorber heat exchange tube are coated with a first adsorbent material and the interstitial spaces between the fins are filled with a second adsorbent material comprising granules, and covered with a suitable mesh.
Figure 4B:
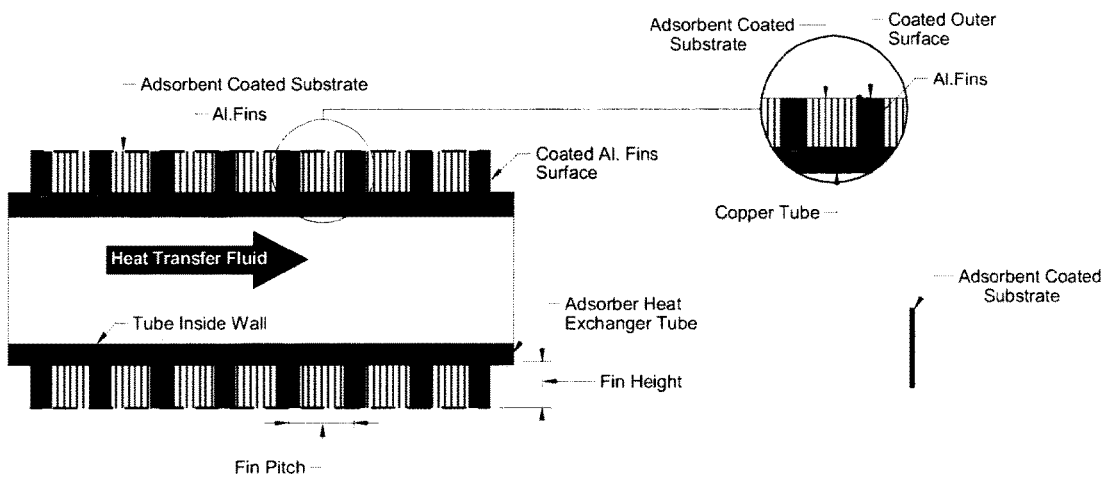
FIG. 4(b) is a representation of an adsorbent bed wherein the fins of the adsorber heat exchange tube are coated with a first adsorbent material and the interstitial spaces between the fins are filled with a second adsorbent material comprising desiccant coated substrate.
Figure 4C:
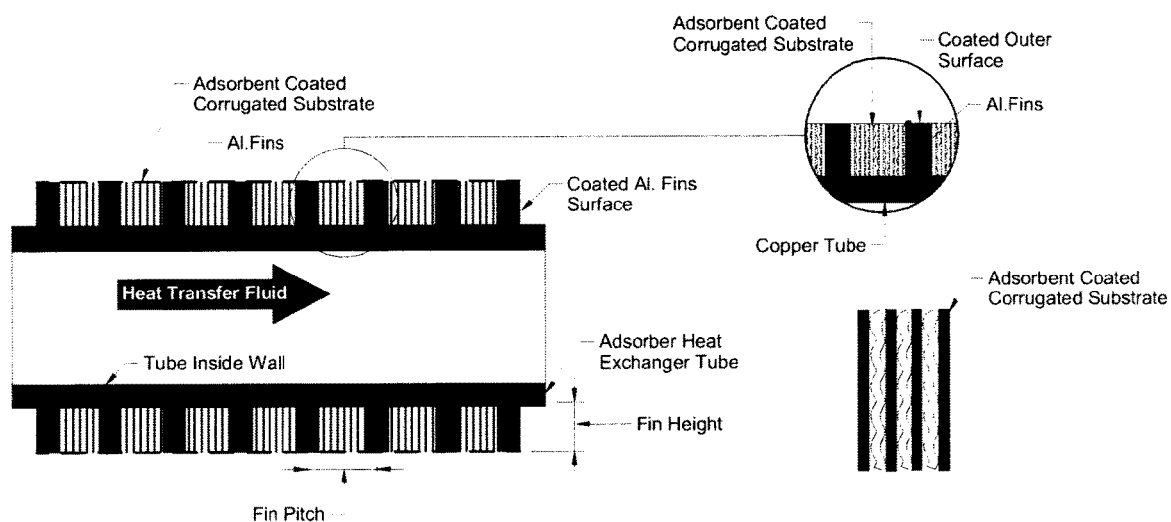
FIG. 4(c) is a representation of an adsorbent bed wherein the fins of the adsorber heat exchange tube are coated with a first adsorbent material and the interstitial spaces between the fins are filled with a second adsorbent material comprising corrugated desiccant coated substrate block.
Figure 4D:
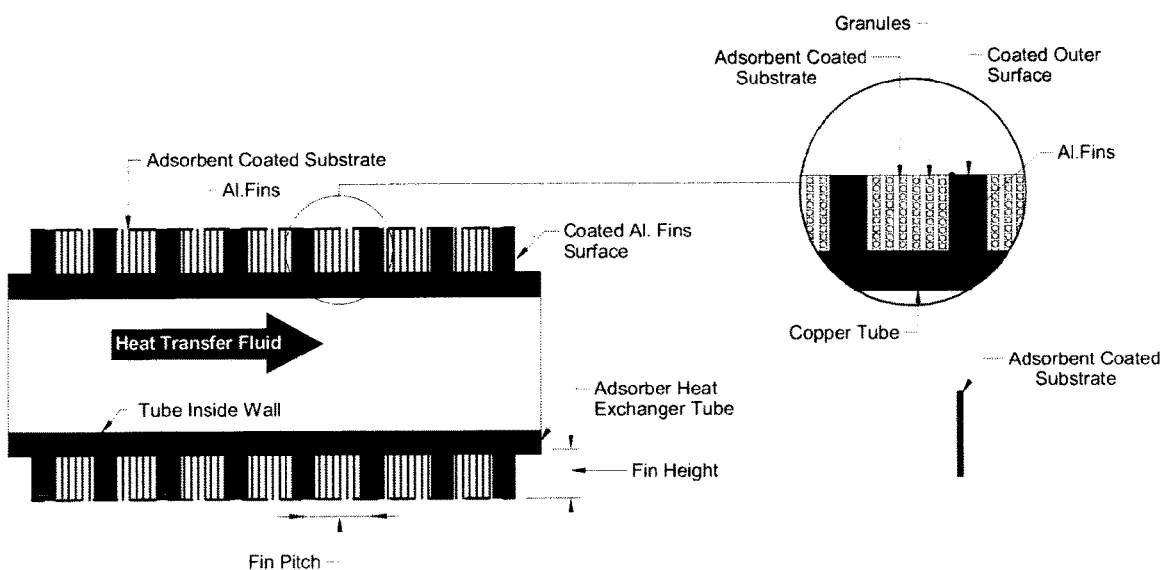
Figure 4E:
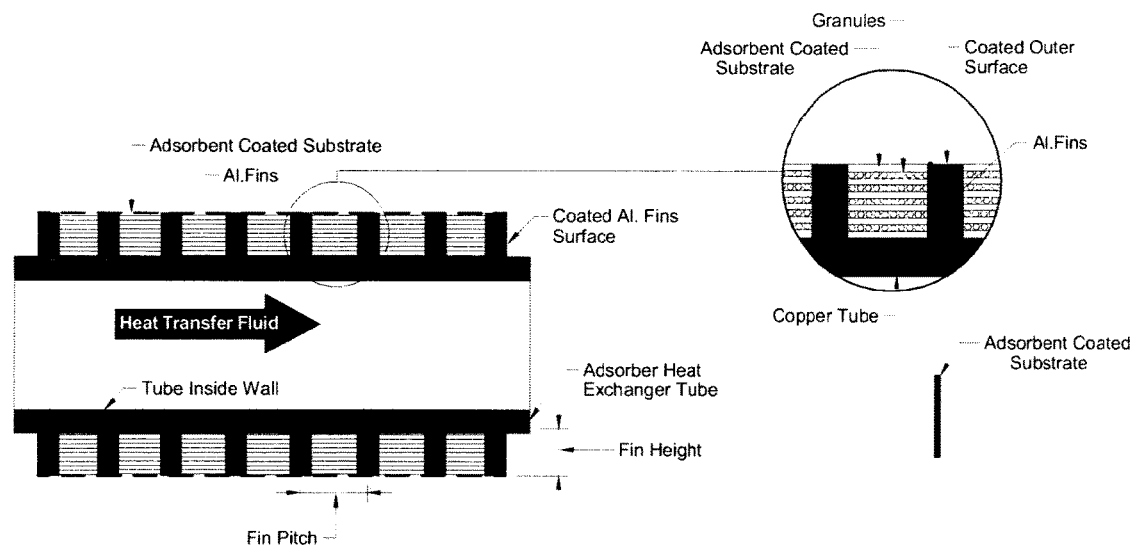

FIG. 4(d) and FIG. 4(e) are representations of an adsorbent bed wherein the fins of the adsorber heat exchange tube are coated with a first adsorbent material and the interstitial spaces between the fins are filled with a second adsorbent material comprising either a corrugated or a plain desiccant coated substrate block and adsorbent granules interspersed in between the desiccant coated substrate block.

Figure 4F:
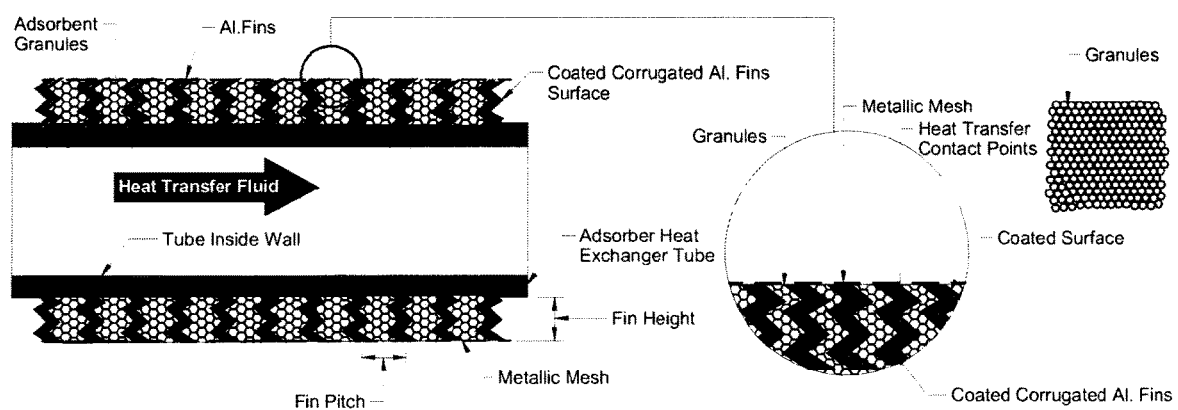

FIG. 4(f) is a representation of an adsorbent bed wherein the fins of the adsorber heat exchange tube are shaped to enhance their surface area and are coated with a first adsorbent material and the interstitial spaces between the fins are filled with a second adsorbent material comprising adsorbent granules, and covered with a suitable mesh.

FIG. 4(g) depicts the hybrid adsorption heat exchanger of FIGS. 4(a) — 4(f) being used in an environment requiring periodic or temporary storage and subsequent release of an adsorbate such as water.

FIG. 4(h) depicts the hybrid adsorption heat exchanger of FIGS. 4(a) — 4(f) being used as an adsorption refrigeration machine.

FIG. 4(i) depicts the hybrid adsorption heat exchanger of FIGS. 4(a) — 4(f) being used as chilled beams.

FIG. 4(j) depicts the hybrid adsorption heat exchanger of FIGS. 4(a) — 4(f) being used as an automobile air conditioning unit.

FIG. 4(k) depicts the hybrid adsorption heat exchanger of FIGS. 4(a) — 4(f) being used as a domestic integral air conditioning unit.

FIG. 4(1) depicts the hybrid adsorption heat exchanger of FIGS. 4(a) — 4(f) being used as a domestic split level air conditioning unit.

Figure 5:
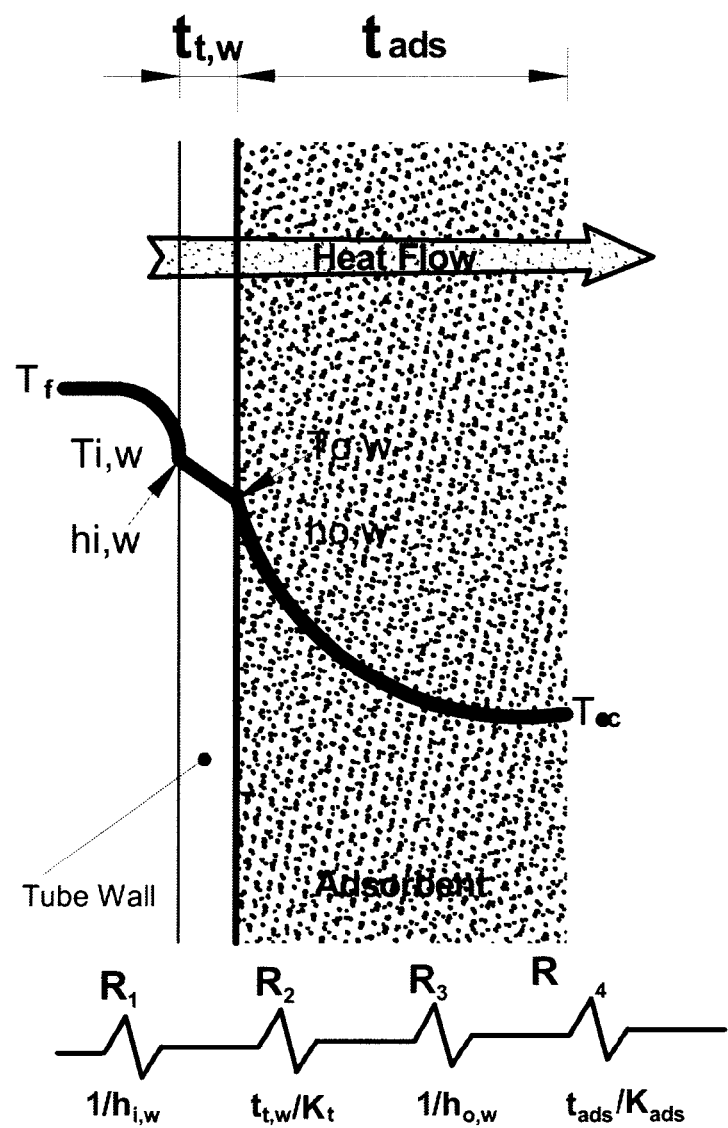

FIG. 5 is a representation of the four heat transfer resistances developing the temperature gradient, during the heat transfer from/to the secondary fluid.

FIG. 6 is a representation of a substrate material that is coated with adsorbent, and perforations are provided thereon in predetermined or desired patterns.

FIG. 7 shows the adsorption isotherm of silica gel S2 proprietary to applicants herein on water and a coated silica gel S2/water adsorbent/refrigerant pairs.

FIG. 8 shows the adsorption uptake data for silica gel S2/water pair at temperatures in the range of 30-70° C.

FIG. 9 shows the adsorption uptake data for silica gel S2/water pair at pressures in the range of 5 kPa and 15 kPa.

FIG. 10 is a comparative representation of adsorption isotherms of water on silica gel S2 type proprietary to applicants and commercially available Fuji RD type silica gel.

FIGS. 11(a), (b) and (c) are temporal profiles of adsorption uptake and pressure of silica gel S2/water pair at adsorption temperatures of 30°, 50° and 70° C. respectively.

FIG. 12 is a comparative representation of the specific capacity, in terms of cooling Watts per liter of adsorbent heat exchanger, both for prior art adsorbers and the potential specific capacity with different hybrid adsorption heat exchangers of the present invention.

FIG. 13 shows the cooling capacity and the COP of the adsorption chiller using conventional packing method, the advanced adsorbent-coated method and the adsorbent-coated hybrid heat exchangers.

FIG. 14 shows the temperature profiles of the major components of the adsorption chiller for the overall heat transfer coefficient of 350 W/m²K.

FIG. 15 shows the performance comparisons of adsorption chiller for pellet, adsorbent-coated and hybrid heat exchangers.

DETAILED DESCRIPTION OF THE INVENTION

A recognised need in the art has been the requirement to enhance the performance of the adsorbent bed that is used in heat exchangers in order to improve the cycle overall performance. Amongst other factors the key parameters that determine the efficiency of the performance of an adsorbent bed are heat and mass transfer aspects. Mass transfer influences both adsorption capacity and adsorption uptake rate. Heat transfer is critical for delivery and extraction of both desorption and adsorption heat, respectively. Other parameters that also affect adsorbent bed performance include adsorbent porosity and pore size, granular size and adsorbent to metal mass ratio.

Heat transfer is subject to multiple levels of resistance within the adsorbent bed. These include the resistance induced by metal to secondary fluid convective heat transfer, conductive heat transfer resistance through the wall of the exchanger, metal to adsorbent contact heat transfer, and conductive heat transfer resistance through adsorbent material. Of these, the heat transfer resistance engendered by metal to adsorbent contact interface plays a predominant role in affecting the efficiency of a heat exchanger, and is dependent on the nature and level of physical contact between the adsorbent and the heat exchanger metal. For example, in simple granular packed adsorbent bed systems, even though the mass transfer performance is very high, the level of heat transfer performance is generally low due to high contact thermal resistance between the adsorbent granules and the heat exchanger metal surface.

It is possible to enhance heat transfer performance of adsorbent material that is used in an adsorbent bed, by mixing adsorbent granules with metal additives to increase thermal conductivity, coating of bed heat exchanger metal with the adsorbent and avoiding the use of granules totally in order to eliminate all contact thermal resistance, covering the adsorbent granules with a polyaniline net, adsorbent deposition over metallic foam, and use of consolidated bed methods.

One of the techniques to enhance heat transfer performance by increasing overall thermal conductivity is by adding metal particles such as aluminium, copper, or graphite/expanded graphite to adsorbent granules of zeolitic materials. While it is reported that the thermal conductivity increases significantly, and the method is also easy to follow, the limitations appear to be a reduction in mass transfer performance and also material limitations. The latter is a serious limitation since it limits the scope of applications where such adsorbent beds are used.

Another technique that is discussed in the art as a replacement to the granular bed approach is to avoid their use altogether and instead coat the metal of the heat exchanger with the adsorbent. This generally involves use of an organic agent to clean the metal surface, formation of a slurry of the adsorbent with an organic binder, and then application on the cleaned metal surface, followed by heating to remove the residual binder. Several different coating techniques are discussed and disclosed in the art. One advantage of this method is that it avoids the heat contact resistance of adsorbent and metal significantly. This method has been considered an alternative to the granular bed approach.

Another method that is discussed in the art is the formation of a polymeric net such as a polyaniline net over the granular bed. This can be done in situ using oxidative in situ polymerisation of aniline on the surface of the adsorbent granules. The disadvantage noted with this method is that while heat transfer resistance is reduced, the mass transfer performance is affected adversely.

Other attempts include deposition of adsorbent over a metallic foam. One example of this method includes deposition of zeolite and copper metal foam. The method essentially comprises coating of the metallic part of the heat exchanger with an epoxy resin, a foaming agent and a metal powder. The adsorbent material is deposited using a colloidal seed solution. For example, in the case of zeolite, this involves seeding, followed by hydrothermal synthesis, washing and drying. It is reported that this method improves the heat transfer characteristics significantly, but results in an increase in metallic mass.

The consolidated bed approach relies on several different steps. For example, compressed adsorbent granules and clay, expandable graphite, moulding granules and addition of binder and metallic foam impregnated with adsorbent granules. It is reported that this method results in a significant increase in heat transfer performance. However, the method may not be efficient in the case of all adsorbent materials, and also has the limitation of bed permeability and cracking.

As can be seen, the approaches that have been proposed in the art look at various solutions as alternatives to the granular bed approach. Conventional wisdom in the art is that granular bed approach adversely affects heat transfer performance, and the only solution is to seek a replacement for this method.

The applicants herein have determined that a hybrid approach provides not only the mass transfer performance which is a significant advantage of the granular bed approach, but also enhanced heat transfer performance. The method of the invention involves an integrated approach to heat exchanger performance enhancement which involves not only adopting a coating for the metal portions of a heat exchanger (or parts thereof), but also ensuring the presence of additional adsorbent material provided between such metallic parts. It has been observed in test studies that such a hybrid adsorbent based heat exchanger provides significant performance enhancement both in terms of heat and mass transfer characteristics.

The object of this invention is to provide a hybrid adsorption heat exchanger that is compact, efficient in converting input cooling power and affordable.

The essence of the invention involves heat transfer enhancement by a hybridisation technique which includes both coating of the heat exchanger fins as well as use of loose porous adsorbent materials between the fins. A refrigerant such as water/ammonia/ethanol/methanol/other assorted refrigerants are exothermically adsorbed and endothermically desorbed, from the porous adsorbent, which is usually packed in an adsorbent bed having good heat transfer characteristics of a single adsorbent. In an adsorbent bed, the major thermal resistances come from the fin of the adsorber and adsorbent material which can be fully eliminated through coating of the adsorbent material. The specific power is intensified through packing of loose adsorbent grains between the coated fins. The invention combines the coated adsorbent as well as packing of the loose adsorbent grains or alternate means such as glass fibres wherein desiccant is either generated in situ or are pre-impregnated, or a combination of different means such as granules and glass fibres.

Figure 1:
FIG. 1 is a representation of a typical finned type block adsorber that is used in the adsorber and desorber heat exchangers.
Figure 1A:
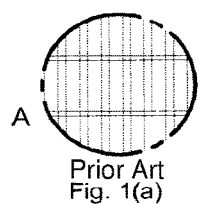
FIG. 1(a) is an exploded view of the section marked 'A' in FIG. 1.
Figure 1B:
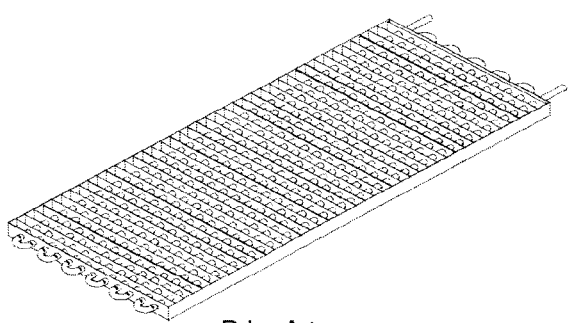
FIG. 1(b) is an isometric view of the same.

FIGS. 1, 1(a) and 1(b) are a representation of a typical finned type block adsorber that is used in the adsorber and desorber heat exchangers.

Figure 2:
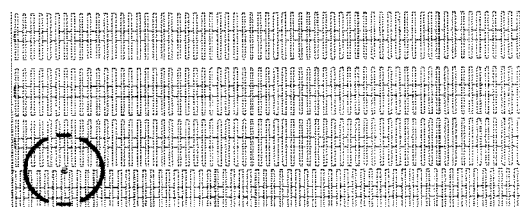
FIG. 2 is a representation of a typical spiral-finned type tube adsorber that is used in heat exchangers.
Figure 2A:
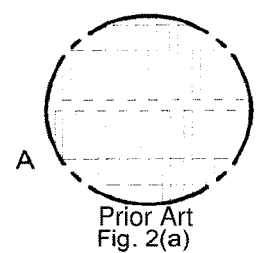
FIG. 2(a) is an exploded view of the section marked 'A' in FIG. 2.
Figure 2B:
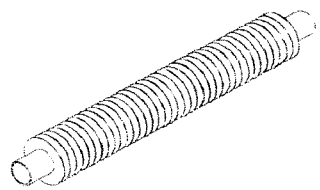
FIG. 2(b) is an isometric view of the same.

FIGS. 2, 2(a) and 2(b) are a representation of a typical finned type tube adsorber that is used in heat exchangers.

Figure 3A:
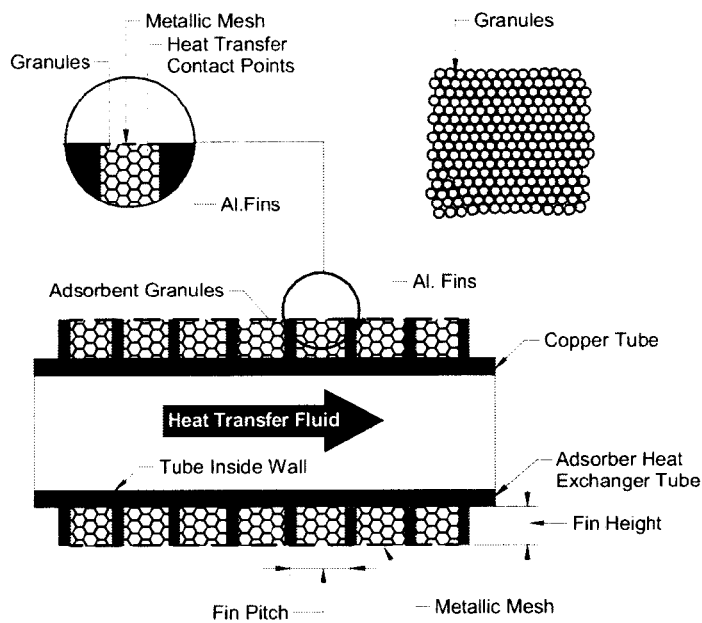
FIG. 3(a) is a representation of prior art finned block adsorbers wherein the adsorber bed is filled/packed with granular adsorbents.

FIG. 3(a) is a representation of prior art finned block adsorbers wherein the adsorber bed is filled/packed with granular adsorbents. As is evident from FIG. 3(a), the secondary fluid flows through the adsorber heat exchange tube, and the fins are provided on the external surface of the heat exchange tube. The interstitial spaces between the fins are packed with adsorber granules. The tube itself may be made of a metal such as copper which promotes heat transfer. The granular packing is finally covered with a metallic mesh. The fins are typically made of aluminium.

Figure 3B:
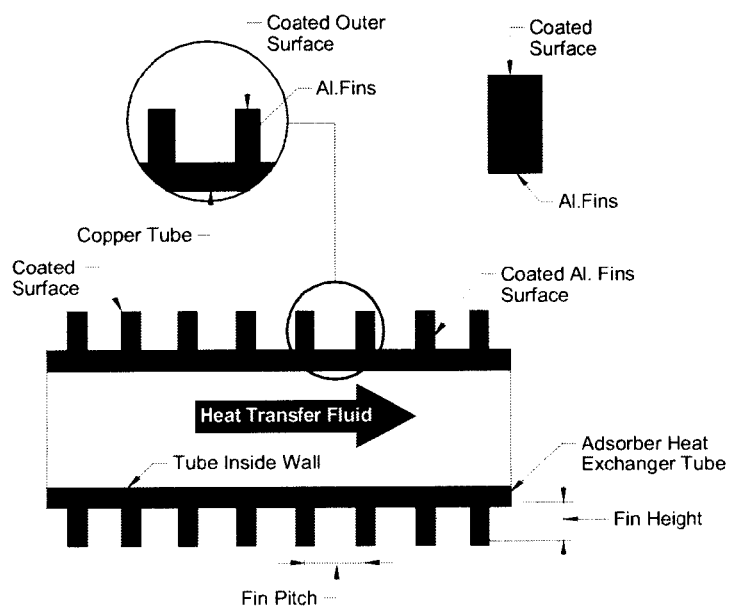
FIG. 3(b) is a representation of prior art coated finned block adsorbers.

FIG. 3(b) is a representation of prior art finned block adsorbers. The secondary fluid flows through the adsorber heat exchange tube, and the fins are provided on the external surface of the heat exchange tube. The interstitial spaces between the fins are vacant. The tube itself may be made of a metal such as copper which promotes heat transfer.

The granular packing in FIG. 4(a) is finally covered with a metallic mesh. The fins are typically made of aluminium and are coated with the adsorbent material using techniques disclosed in the art. The coating procedures are discussed in some detail in this document, and involve the use of resins and binders to ensure uniform deposition of adsorbent on the fins.

FIG. 4(b) is a representation of an adsorbent bed wherein the fins of the adsorber heat exchange tube are coated with a first adsorbent material and the interstitial spaces between the fins filled with a second adsorbent material comprising desiccant coated paper. The desiccant coated substrate may be one wherein the desiccant is coated or impregnated into the glass fiber or may be one wherein the desiccant is generated in situ. The first and second adsorbents may be same or different. The coating can be uniform across the external surface of the heat exchange tube. In the alternative, only the fins are coated, and the surface of the heat exchanger tube between two fins remains uncoated.

FIG. 4(c) is a representation of an adsorbent bed wherein the fins of the adsorber heat exchange tube are coated with a first adsorbent material and the interstitial spaces between the fins filled with a second adsorbent material comprising corrugated desiccant coated substrate block. The desiccant coated substrate may be one wherein the desiccant is coated or impregnated into the glass fiber or may be one wherein the desiccant is generated in situ. The first and second adsorbents may be same or different. The coating can be uniform across the external surface of the heat exchange tube. In the alternative, only the fins are coated, and the surface of the heat exchanger tube between two fins remains uncoated.

FIG. 4(d) and FIG. 4(e) are representations of an adsorbent bed wherein the fins of the adsorber heat exchange tube are coated with a first adsorbent material and the interstitial spaces between the fins filled with a second adsorbent material comprising either a corrugated or a plain desiccant coated substrate block and adsorbent granules interspersed in between the desiccant coated substrate block. In FIGS. 4(b), 4(c) and 4(d) the substrate blocks are provided perpendicular to the axis of the tube, whereas in FIG. 4(e) the substrate blocks are provided parallel to the tube axis. The desiccant coated substrate may be one wherein the desiccant is pre-coated/impregnated into the glass fiber or may be one wherein the desiccant is generated in situ. The first and second adsorbents may be same or different. The coating can be uniform across the external surface of the heat exchange tube. In the alternative, only the fins are coated, and the surface of the heat exchanger tube between two fins remains uncoated. The substrate blocks in cases of FIG. 4(b) to FIG. 4(e) may also be perforated to enhance both mass and heat transfer. FIG. 4(e) may also be perforated to enhance both mass and heat transfer.

FIG. 4(f) is a representation of an adsorbent bed wherein the fins of the adsorber heat exchange tube are coated with a first adsorbent material and the interstitial spaces between the fins filled with a second adsorbent material comprising adsorbent granules. The fins are corrugated in this embodiment and may also if desired, be perforated in any desired pattern in order to enhance heat and mass transfer. The first and second adsorbents may be same or different. The coating can be uniform across the external surface of the heat exchange tube. In the alternative, only the fins are coated, and the surface of the heat exchanger tube between two fins remains uncoated.

FIG. 5 is a representation of heat transfer regions in a coated fin, and is described in detail below.

FIG. 6 is a representation of a substrate material that is coated with adsorbent, and perforations are provided thereon in predetermined or desired patterns. This substrate material can be converted into the external extensions (fins), for the heat exchanger, and adsorbent material filled in the beds formed thereby.

The invention essentially resides in hybridising the adsorbent bed such that not only is the fin coated with an adsorbent material, the interstitial spaces between the fins are provided with an additional adsorbent material. The second filler adsorbent material may be the same as the adsorbent material provided in the coating or may be different. For example, the filler adsorbent material may be in the form of granules that are available such as zeolite material, activated carbon, activated alumina, or silica gel. Alternatively, the filler material can comprise fibers or sheets of glass, ceramic, activated carbon, graphite, organic or inorganic substances having adsorbent material provided thereon either by coating, dipping, impregnation or by formation in situ or any other method.

The hybrid heat exchanger of the invention provides flexibility in combining different adsorbent forms. Tests establish that this hybrid heat exchanger provides significant enhancement both in terms of mass transfer and heat transfer performance.

The approach to the invention comprised assessing current state of the art in respect of granular adsorbent provided within an uncoated finned space. It is known in the art that the efficiency (specific capacity) of such systems is around 100 watts per liter of adsorbent heat exchanger. In view of this, the approach was to:

a. increase the watts output per liter of adsorbent heat exchanger volume, thus decreasing the overall volume, footprint and cost.

b. to improve the adsorption and desorption kinetics in order to additionally enhance the watts per absorber heat exchanger output thus further reducing the footprint, volume and cost of the adsorption chiller. The present invention achieves both simultaneously.

In order to increase and optimize the performance of adsorbent heat exchanging devices, multiple variables were utilized. These comprise:

1. Substrate: the hybrid absorber heat exchanger of the invention relies on one part of the heat exchanger having an adsorbent adhered thereto. The invention provides flexibility in terms of substrate choice depending on the method of adhesion that is employed to ensure adhering of the adsorbent to the substrate. The substrates can be aluminum foil, copper foil, organic metal fiber sheet, inorganic fiber sheet carbon reinforced plastic, etc. The fin types include flat/plain, corrugated, louvered, sine wave, rippled, pyramid, or pin type.

2. Substrate thickness: The substrate thickness, depending on the type of support the substrate provides to the adsorbent, and thermal conductivity as part of the overall heat exchanger design, will typically range from 0.5 mm-2.0 mm, more typically from 0.1 mm to 1.0 mm.

3. Substrate shape: Depending on the choice of the substrate, the substrate may be flat, corrugated, square sign wave, or differently shaped e.g. triangular etc.

4. Adsorbent: The adsorbent material to be adhered to the substrate will typically be silica gel, molecular sieve, composites, or activated carbon, and can also comprise under development adsorbents which have a high surface area and are heat transfer fluid tolerant. For example, if water is used as the refrigerant, then the adsorbent should be water tolerant. If other refrigerants are used in the adsorption chillers such as ethanol, methanol and ammonia and HFC based refrigerants, the adsorbents should be chemically inert to such refrigerants. Some of these adsorbents already exist while others are under development. Typically these would be from the family of MOFs, aluminum phosphate, COFs, FAMs and FMMs, composites, etc. As the enhanced surface area and bulk density are complementary factors, the adsorbents of choice can depend on both the useful capacity under operating capacity of boundaries of the adsorbent but will be of higher bulk density so that the overall adsorption, and hence the specific performance in kW per adsorbent heat exchanger, is maximized. Further the kinetics of the adsorbent, in terms of adsorption and desorption, and the means to enhance the 'kinetics' of a given adsorbent, will also play a significant role to maximize the overall capacity in terms of Watt per liter of adsorbent heat exchanger.

These adsorbents, to enhance the useful capacity, can further be doped with doping agents such as inorganic metal salts such as sodium chloride, calcium chloride, lithium bromide, magnesium chloride, magnesium sulphate, calcium nitrate, manganese chloride etc., To improve the thermal conductivity of the heat flow from within the adsorbent to the substrate, as well as overall kinetics, use can be made of adding highly conductive materials like graphite, expanded graphite, copper powder etc. in small quantities.

In some cases, there can be a combination of both doping and addition of thermally conductive materials.

5. General methods of adhering the adsorbent to the substrate: There are several known methods, as enumerated below, of adhering the adsorbent to the substrate but this invention is not limited to the existing art or methods:

a. One method of adhering the desiccant to the substrate, particularly impervious substrates, is to use non-masking binders or glues. The binder of glues can be inorganic, organic and also the combination of both.

b. Substrates, particularly porous substrates, the adsorbent can be impregnated again with the help of suitable non masking binders/loops. The binder of glues can be inorganic, organic and also the combination of both. The impregnation may also include a dip coating method.

c. In yet another method, the substrate, particularly porous substrate, the adsorbent can be synthesized in situ without the use of binders of glues.

d. In yet another method, starting with the substrate, typically an aluminum foil, the adsorbent can be synthesized in situ on the surface of the substrate, utilizing the substrate material as one of the elements to grow the adsorbent crystals.

Heat transfer in the adsorbent bed is managed by regeneration and adsorption using a secondary fluid such as water. For the heat transfer to and from the secondary fluid there are four heat transfer resistances as is shown in FIG. 5. The resistances are:

R.1 The convective heat transfer resistance between the secondary fluid and the metal wall.
R.2 The heat transfer resistance through the wall of the heat exchanger.
R.3 The contact heat transfer resistance between the metal and adsorbent.
R.4 The conductive heat transfer resistance through the desiccant mass As can be seen the heat exchanging device design can affect the heat transfer resistances.

In the above, R3 is predominant and most significant. Thus far, the effort and attempt has been to coat adsorbents on the heat exchanger metal surface, typically the extended fin, typically aluminium. In doing so the conductive heat transfer resistance through the desiccant mass (R4) has been ignored and eliminated as no further adsorbent is placed between the extended heat exchanger surfaces. While the benefit is gained through reduction of R3, there is a significant trade off and loss of adsorption capacity and therefore mass transfer as the amount/mass of desiccant gets limited in the applied coating, thus reducing the adsorbent to metal mass ratio.

The present invention aims to maintain a near optimal adsorbent to metal mass ratio by combining the desiccant coated extended surface of metal/fin by not only reducing R3 but also considerably improve the kinetics, along with the use of granular material within the coated fins spaces even though limited R4 will be encountered, thus providing an overall performance enhancement of >35/40% in terms of Watts per liter of adsorbent heat exchanger using the traditional adsorbent heat exchanger with adsorbent granular material packed within the heat exchanger fin surface. There are also other methods of filling the voids as described hereinafter.

The adsorbent is adhered to the substrate by applying silica gel granular/powder to aluminum foil using a non-masking binder from a class of organic and as well as separately inorganic binders, and also using pore cleaning agent[s] for the adsorbent. Zeolites can also be used instead of silica gel.

The coating on the extensions can be achieved by any method that is already known, such as that disclosed in U.S. Pat. No. 8,053,032 (direct crystallization of a zeolite layer on a substrate), US Patent Publication 2010/0136326 (coating the substrate surface with a silicate layer obtained through solvothermal synthesis), US Patent Publication 2011/0183836 (coating an aluminium containing substrate with a microporous layer of aluminium phosphate zeolite), or any other method known in the art for coating the substrate and fins.

Irrespective of the method of adhering the adsorbent to the substrate or the substrate type, the amount of adsorbent has to be optimal so that too much adsorbent does not inhibit heat transfer from the outside layer to the heat exchanger. Typically the adsorbent quantity can vary from 10 GSM to 500 GSM but will more specifically lie within 150 to 300 GSM depending upon the adsorbent, the method of adhering the absorbent to the substrate, the bulk density of adsorbent and the use, if any, of the binder/glue.

In the hybrid adsorbent heat exchanger, while the heat exchanger surface has adsorbent adhered to by means and methods explained above but not limited thereto, in the present invention, the adsorbent is filled within the voids of the extended fin heat exchanger surface. The choice of the type and methods of placement of such adsorbents can be as follows:

1. Plane naturally granular adsorbent, of suitable mesh size e.g. silica gel
2. Adsorbent in powder form but made into granules of suitable mesh.
3. Adsorbent adhere to a substrate, as a sheet, or as sheet glass or in any other shape e.g. corrugated, square/rectangular, triangular etc. with or without doping, with or without thermally conductive additives like expanded graphite, graphene etc.

In the present invention of the hybrid heat exchanger, extensive testing has been done using granular silica gel. In the application of adsorption chillers, while there is a choice of many working pairs of adsorbent and refrigerants, the most typically and commonly used or employed is the silica gel-water pair. In most adsorption chillers under manufacturer and also the research being done in this field around the world, the outstanding silica gel of choice is and has been the high density granular or beaded silica gel as available from Fuji Sylsia Co. Ltd., Japan. This material typically has a surface area in the range of 600-800 $m^2/g$ and bulk density of 700-900 g/liter, depending upon the whether the material is beaded or granular, and if granular on the mesh side.

The present invention also benchmarks a new hybrid adsorbent heat exchanger with the traditional adsorbent heat exchanger using Fuji RD type silica gel. Fuji RD type silica gel, because of its characteristics and kinetics, has become the adsorbent of choice for silica gel-water pair based adsorption chillers, globally, both in commercial production and research. Applicants herein have also developed a proprietary silica gel labeled S2, which through extensive testing, has shown outstanding performance potential as an adsorbent for silica gel-water based adsorption chillers. Examples of its performance and kinetics are shown in FIGS. 7-11.

Adsorption capacity of adsorbent/refrigerant pair depends on the porous properties (pore size, pore volume and pore diameter) of adsorbent and isothermal characteristics of the pair. The porous properties of various zeolites, silica gels, activated carbons, activated alumina, MOFs (metal-organic frameworks), COFs (covalent organic frameworks), and FAMs (functional adsorbent materials) are presented which are determined from the nitrogen adsorption isotherms. The standard nitrogen gas adsorption/desorption measurements on various adsorbents at liquid nitrogen of temperature 77.4 K are performed. Surface area of each adsorbent is determined by the Brunauer, Emmett and Teller (BET) plot of nitrogen adsorption data. Table 1 shows the surface area, pore volume and apparent density of silica gels (A and RD type), activated carbon fibers of type FX-400 and A 20, granular activated carbon, activated carbon powder of type Maxsorb III and two different MOFs. As can be seen from Table 1, the BET surface area of Maxsorb III and MIL-101Cr are as high as 3140 and 4100 m$^2$/g, respectively. However, utilization of Maxsorb III and MIL-101Cr as adsorbents in commercial adsorption chillers has been hindered due mainly to its cost, which is above USD 300 per kg. On the other hand silica gels have been used in commercial adsorption chillers and the cost of silica gel samples is around 10-15 USD per kg.

TABLE 1

Porous properties of various potential adsorbent materials.

| Adsorbent | Surface area (m$^2 \cdot$ g$^{-1}$) | Pore volume (cm$^3 \cdot$ g$^{-1}$) | Apparent density (g $\cdot$ cm$^{-3}$) |
|---|---|---|---|
| Silica gel (type A) | 650 | 0.28 | 0.73 |
| Silica gel (type RD) | 720 | 0.37 | 0.7 |
| Silica gel (type S2) | 700 | 0.34 | 0.73 |
| Activated carbon fiber (FX 400) | 700-2500 | 0.5-1.4 | 0.3 |
| Activated carbon Fiber (A-20) | 1900 | 1.028 | 0.25 |
| Granular activated carbon | 700-1500 | 0.5-1.0 | 0.4 |
| Highly porous activated carbon (Maxsorb III) | 3140 | 1.7 | 0.31 |
| Zr$_6$O$_4$(OH)$_4$(Linker)$_6$ | 2064 | 0.97 | — |
| MIL-101Cr | 4100 | 2.0 | |

Turning now to FIG. 7 onwards, the graphical representations display the enhanced adsorbent capacity of the invention.

FIG. 7 shows the adsorption isotherms of parent silica gel S2/water and coated S2/water adsorbent/refrigerant pairs for adsorption temperature of 30° C. and pressure ranges from 0.7 to 3.8 kPa. For the said adsorption isotherm, the adsorbent sample temperature is kept constant whilst the evaporator temperature increases stepwise until the relative pressure reaches above 0.9. It can be seen from FIG. 7 that, the adsorption capacity of silica gel S2/water pair is as high as 0.34 kg kg$^{-1}$ at adsorption temperature of 30° C. and pressure at around 3.6 kPa. The adsorption capacity of coated silica gel S2/water pair is similar to that of the parent S2/water pair. It can be observed that, for both parent S2/water pair and coated S2/water pairs, the adsorption capacity increases linearly with the increase of pressure in the whole studied range.

FIGS. 8 and 9 show the adsorption uptake data of silica gel S2/water pair for temperatures 30-70° C. and pressure up to 5 kPa and 15 kPa, respectively. The former pressure rage is suitable for adsorption cooling applications and the relatively higher pressures are required for adsorption desalination applications. As can be observed from FIGS. 8 and 9, the adsorption uptake values increase linearly with the increase in pressure for all measured adsorption temperatures, which implies that the parent silica gel S2/water paper is suitable for both adsorption cooling and desalination applications.

FIG. 10 shows the adsorption isotherms of silica gel S2/water pair and silica gel RD/water pair for temperatures between 30 and 70° C. and pressure up to 5 kPa, which is the operation range of silica gel/water based adsorption chillers. It is evident from FIG. 10 that the adsorption isotherms data of silica gel S2/water and silica gel RD/water pairs are comparable and one can choose either adsorbent depending on the cost and availability of the adsorbent.

FIGS. 11(a), 11(b) and 11(c) show the temporal profiles of adsorption uptake and pressure of the silica gel S2/water pair at adsorption temperatures of 30, 50 and 70° C., respectively. It is visible from FIGS. 11(a)-11(c) that the adsorption kinetics of the studied pair is relatively faster at the early stages of adsorption processes. Moreover, more than 80% of total uptake occurs within the first 5 minutes and thus the silica gel S2/water pair seems to suitable for adsorption cooling applications.

The starting point for the production of an adsorption heat exchanger in accordance with the invention is at first a heat exchanger structure which is produced separately. It is produced according to the known method from materials of high thermal conductivity. Suitable for this purpose have proven to be metallic systems such as ones made of copper, aluminum, carbon, reinforced plastic or special steel. Ceramic materials or combined material systems are also possible.

Suitable heat exchanger structures realize a circulation system for a heat carrier medium which is in connection with the outside area of the adsorption heat exchanger. In addition, heating wires or other heat sources can be embedded for heating the heat exchanger structures. In order to produce the largest possible surface towards the sorbent material system, a lamella-like or honeycomb-like structure is preferred. It can also be in the form of a sponge or foam. Based on this heat exchanger structure which is produced separately at first, an inside coating with sorbent material is now carried out as follows.

In a first method step, an adhesive layer is applied to the wall of the heat exchanger facing towards the sorbent material, which hereinafter shall be referred to as inside wall. An adhesive is used for this purpose which forms a solid layer at first. For realizing said adhesive layers it is possible to use different methods such as immersion, flooding or spraying. The method steps of adhesive coating can further be repeated for setting an optimal layer thickness. It is especially advantageous in this respect to set the viscosity of the applied adhesive by tempering or by enriching or evaporation with solvents for example. It is alternatively also possible to apply the adhesive in a solid powdery state to the walls of the heat exchanger. Such powder coating is especially useful in planar heat exchanger structures.

The heat exchanger can further be filled at first with powdery adhesive which is then activated by heating of the heat exchanger structure in regions of the heat exchanger close to the wall, so that there is bonding in the area close to the walls and the subsequent removal of the non-adhering powdery adhesive material from the areas remote of the walls is possible by shaking, blowing or rinsing. Irrespective of the choice of adhesive or the chosen application method, the adhesive layer in the region close to the wall must adhere at least in such a stable manner that during the subsequent method step in which the sorbent material is introduced into the heat exchanger there is no functionally impairing mixture of the adhesive of the sorbent material.

After the coating steps are completed and the coating on the metallic portions are dry, the interstitial spaces can be filled in with conventional granular adsorbent material, or with glass fiber sheets that are impregnated with adsorbent material (or where the adsorbent is formed in situ using technology proprietary to applicants). Contrary to disclosures in the art, the heat transfer performance of this hybrid heat exchanger is significantly high over what has hitherto been known in the art.

Studies show that the heat transfer performance of the hybrid heat exchanger device of the invention are significantly higher than those of either of the two currently available prior art systems—which use either a granular bed or a coated fin system in isolation.

The primary difficulty of adsorption heat pumps is the poor heat transfer between the adsorbent materials and the heat transferring media namely cooling medium for adsorption process and heating medium for desorption process. Conventional adsorber heat exchangers or the conventional manner of packing the adsorber materials is packing the adsorbent around the finned-tube of the heat exchanger. This method is widely used due to the simplicity in the manufacturing and the limitation in the attachment or coating technology of the adsorbent to the fins of the heat exchanger.

The effective coating of the adsorbent materials on the extended surfaces of the heat exchanger can greatly improve in the heat and mass transfer mechanism of the adsorber of adsorption cycles. Two significantly outstanding features or advantages of the coated adsorber heat exchangers are (1) the improvement in adsorption kinetics via effective heat transfer and (2) the reduction in thermal mass. The major contribution of the former feature is the reduction in cycle time whilst the less thermal mass directly translates to better performance or coefficient of performance (COP). These two features synergistically improve the adsorption cycle both energetically, footprint-wise and more importantly the lowering in capital cost.

FIG. 13 shows the cooling capacity and the COP of the adsorption chiller using conventional packing method, the advanced adsorbent-coated method and the adsorbent-coated hybrid heat exchangers. It should be noted that the evaporator and the condenser remain the same for both cases. It is observed that the adsorbent-coated and adsorbent-coated hybrid types provide significant performance improvement.

The overall heat transfer coefficient of the advanced adsorbent-coated and adsorbent-coated hybrid heat exchanger is around 350 to 350 W/m²K depending on the adsorber/desorber configuration. FIG. 14 shows the temperature profiles of the major components of the adsorption chiller for the overall heat transfer coefficient of 350 W/m²K. As can be seen from FIG. 14, all four heat exchangers work efficiently and the chiller produces effective cooling due to faster adsorption kinetics resulted from improved heat transfer and smaller thermal mass.

FIG. 15 shows the performance comparisons of adsorption chiller for pellet, adsorbent-coated and hybrid heat exchangers. The performance comparisons have been made in terms of specific cooling power (SCP), coefficient of performance (COP) and volumetric efficiency. As can be seen from FIG. 15, the SCP and COP values for coated and hybrid type heat exchangers are comparable. However, SCP increases about 8% and COP increases more than 100% in case of pellet and hybrid type heat exchangers due to faster kinetics and less thermal mass. On the other hand, the volumetric efficiency of hybrid heat exchanger is about 35% higher than the pellet type heat exchanger and about 18% higher than that of the adsorbent-coated heat exchanger due to higher mass of adsorbent in the same volume which results in more cooling power and thus significantly contribute in the reduction of adsorption system footprint and capital cost.

Another advantage of the invention that has been observed from studies conducted is that the specific capacity of the hybrid heat exchanger device of the invention is significantly better than those of prior art adsorbers. FIG. 12 is a comparative representation of the specific capacity, in terms of cooling Watts per liter of adsorbent heat exchanger, both for prior art adsorbers and the potential specific capacity with different hybrid heat exchangers of the present invention.

We claim:

1. A hybrid adsorption heat exchanging device comprising:
at least one tubular or micro channel structure carrying a heat transfer fluid;
the external surface of said structure being provided with extensions in at least two locations;
said extensions forming an adsorbent bed there-between filled with one or more adsorbent materials;
a coating of adsorbent material adhered onto at least a part of said extensions, said coating having been adhered in a separate process before filling of the adsorbent bed,
wherein the adsorbent material filling the adsorbent bed comprises adsorbent granules or a sheet with the adsorbent being coated, deposited, impregnated, or generated in situ.

2. A device as claimed in claim 1 wherein the extensions run longitudinally along a length of the tubular or micro channel structure.

3. A device as claimed in claim 1 wherein the extensions run circumferentially around the tubular or micro channel structure.

4. A device as claimed in claim 1 wherein the height of each extension remains uniform along its entire length.

5. A device as claimed in claim 1 wherein the tubular or micro channel structure and the extensions are integral.

6. A device as claimed in claim 1 wherein the tubular or micro channel structure and the extensions are made of the same material.

7. A device as claimed in claim 1 wherein the tubular or micro channel structure and/or the extensions comprise a heat conductive material selected from metallic, ceramic based, polymeric or carbon based materials.

8. A device as claimed in claim 1 wherein the coating of adsorbent material on each extension is the same or different from the adsorbent filling in the adsorbent bed.

9. A device as claimed in claim 8 wherein the adsorbent material filling in said adsorbent bed is selected from the group consisting of zeolites, mesoporous silicates, insoluble metal silicates, silica gel type A, silica gel type RD, silica gel type S2, activated carbon fiber, granular activated carbon, activated alumina, highly porous activated carbon, $Zr_6O_4(OH)_4$ bonded with linkers, MIL-101Cr, metal-organic frameworks, covalent organic frameworks, and functional adsorbent materials, singularly or in any combination thereof.

10. A device as claimed in claim 9 wherein the adsorbent material filling in the adsorbent bed comprises adsorbent granules having a pore diameter in the range of 3 to 100 Angstrom.

11. A device as claimed in claim 1 wherein the extensions are corrugated on an external surface thereof prior to coating the extension with adhered adsorbent material.

12. A device as claimed in claim 1 wherein the coating of adsorbent material on the extensions is an adsorbent material selected from the group consisting of zeolites, mesoporous silicates, insoluble metal silicates, silica gel type A, silica gel type RD, silica gel type S2, activated carbon fiber, granular activated carbon, activated alumina, highly porous activated carbon, $Zr_6O_4(OH)_4$ bonded with linkers, MIL-101Cr, metal-organic frameworks, covalent organic frameworks, and functional adsorbent materials, singularly or in any combination thereof.

13. A device as claimed in claim 1 wherein the heat transfer fluid is selected from the group consisting of water, lower alcohols, and oils.

14. A device as claimed in claim 1 wherein the adsorbent material in the adsorbent bed is provided with one or more fillers selected from the group consisting of zeolites, mesoporous silicates, insoluble metal silicates, silica gel type A, silica gel type RD, silica gel type S2, activated carbon fiber, granular activated carbon, activated alumina, highly porous activated carbon, $Zr_6O_4(OH)_4$ bonded with linkers, MIL-101Cr, metal-organic frameworks, covalent organic frameworks, and functional adsorbent materials, singularly or in any combination thereof.

15. A device as claimed in claim 14 wherein said filler in the adsorbent bed is a doped filler, wherein the doping agent is selected from the group consisting of inorganic metals salts calcium chloride, lithium bromide, magnesium chloride, magnesium sulphate, calcium nitrate, and manganese chloride.

16. A device as claimed in claim 1 wherein in addition to the adsorbent material in the adsorbent bed, one or more additives selected from the group consisting of copper, aluminum, and graphite/expanded graphite are added.

17. A device as claimed in claim 1 wherein a polymeric mesh is provided over the adsorbent materials filling said adsorbent bed.

18. A device as claimed in claim 17 wherein the polymeric mesh is a polyaniline mesh.

19. A device as claimed in claim 1 disposed in an environment requiring storage and subsequent release of adsorbate.

20. A device as claimed in claim 19 disposed within at least one of: an adsorption refrigeration machine, chilled beams, an automobile air conditioning unit, an integral air conditioning unit, and a split level air conditioning unit.

* * * * *